Dec. 4, 1923.     1,476,104
H. C. V. POULSEN
STEERING MECHANISM
Filed July 2, 1922
Fig. 1.
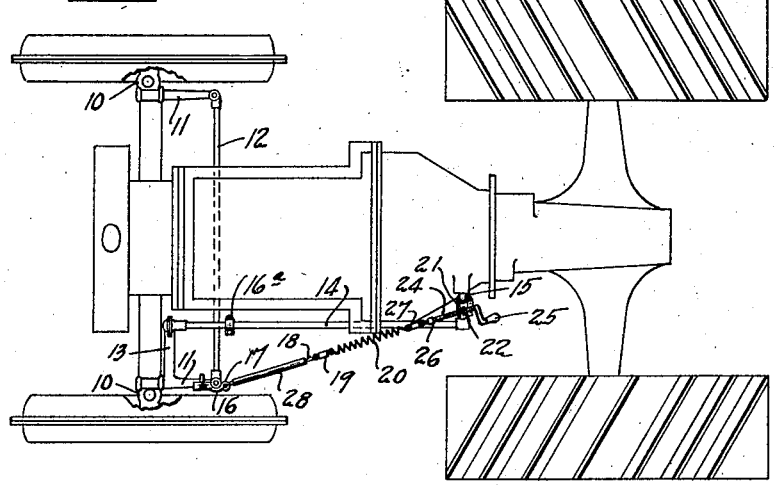
Fig. 2.
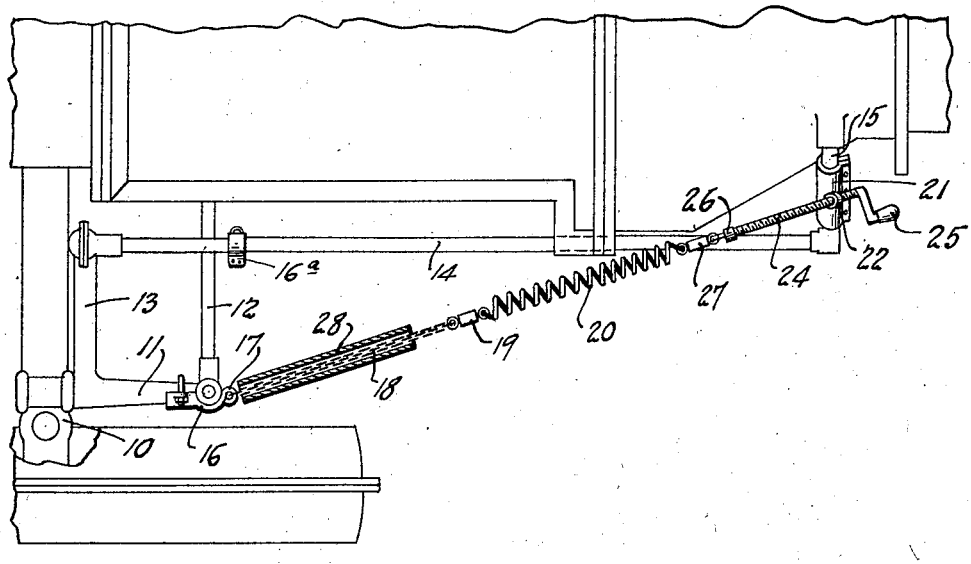
Fig. 3.
Inventor
H.C.V. Poulsen
By Watson E. Coleman
Attorney Patented Dec. 4, 1923.

1,476,104

UNITED STATES PATENT OFFICE.

HERBERT C. V. POULSEN, OF WALNUT, IOWA.

STEERING MECHANISM.

Application filed July 22, 1922. Serial No. 576,765.

*To all whom it may concern:*

Be it known that I, HERBERT C. V. POULSEN, a citizen of the United States, residing at Walnut, in the county of Pottawattamie and State of Iowa, have invented certain new and useful Improvements in Steering Mechanisms, of which the following is a specification, reference being had to the accompanying drawings.

This invention relates to improvements in steering mechanisms, and more particularly to an improvement in the steering mechanism of tractors.

It is well known to those familiar with the art when a tractor is employed in plowing there is a tendency of the steering wheels thereof to turn toward the furrows and in order to overcome this tendency it is necessary that the operator of the tractor maintain a steady strain upon the steering wheel. An important object of this invention is to relieve the strain from the driver's arms.

A further object of the invention is to provide a device of this character which will interfere but slightly in the ordinary operation of the tractor, thereby eliminating the necessity of removing the same from the tractor.

A still further object of the invention is to provide a device of this character which places a tension upon the steering mechanism tending to turn the steering wheels in a direction away from the furrow and in which the tension may be adjusted to the exact desired amount, thereby permitting the device to be employed alike for use in deep or shallow plowing.

An additional object of the invention is to provide a device of this character which is extremely simple in its construction and operation, may be readily attached to a tractor, and which is durable and dependable in service.

These and other objects I accomplish by the construction and arrangement shown in the accompanying drawings wherein for the purpose of illustration is shown a preferred embodiment of my invention and wherein like reference characters designate like parts throughout.

In the drawings:—

Figure 1 is a plan view of a tractor showing steering mechanism constructed in accordance with my invention;

Figure 2 is an enlarged fragmentary plan view, parts of the steering mechanism being shown in section; and Figure 3 is a detail sectional view showing the manner of adjusting the tension of the spring.

Referring now more particularly to the drawings, the numeral 10 indicates the spindles bearing the steering arms of the tractor, 11 the spindle arms which are connected by the connecting rod 12, 13 the steering spindle stud to which the forward end of the drag link 14 is connected, and 15 the usual oscillatory steering arm, all of which form a normal part of the steering mechanism of most forms of tractors.

Secured to the rear end of the spindle rod 11 at that side of the tractor at which the steering arm 15 is disposed is a clamp 16 embodying an eye 17. In this eye is detachably engaged one end of a flexible connecting member 18, the opposite end of which is engaged with one end of a swivel 19, the other end of the swivel being engaged with one end of a tension spring 20. A clamp 16ª is engaged with the drag link 14 for the reception of the eye engaging end of the flexible member 18 when the device is not in use.

Mounted upon the steering arm is a clamping yoke 21 having an outstanding swiveled ear 22 which is provided with a threaded aperture 23 facing the forward end of the tractor and the clamp 16. Through the threaded opening 23 is directed a threaded rod 24, the rear end of which is provided with an operating crank 25 and the forward end of which has swivel connection, as at 26, with a swivel 27 engaged with the opposite end of the spring 20. It will be seen that by rotating the rod 24 through medium of the crank 25 the tension of the spring 20 may be adjusted to suit the needs of the operator.

In the operation of the device, when the free end of the steering arm 15 to which the drag link 14 is connected moves rearwardly, the wheels of the tractor are shifted to turn the tractor to the right or toward the furrow. This rearward movement of the arm will cause further tensioning of the spring 20, since the arm to which one end of the spring is connected moves rearwardly and the clamp attached to the spindle arm 11 moves forwardly and outwardly from the tractor. During a turn to the left, the movement of the steering arm is reversed and the tension of the spring is accordingly relaxed so that no interference is met during such a turn. The strain placed upon the steering mechanism by the spring 20 may be adjusted to a desired degree where there is just sufficient strain to compensate for the tendency of the wheels to turn to the right or toward the furrow and the necessity of the operator maintaining a constant strain upon the steering wheel to prevent such turning movement is accordingly eliminated. By releasing the tension of the spring which may be accomplished either through the adjustment of the rod 24 in the threaded opening 23 or by disconnecting the flexible element 18 from the eye 17 and engaging it with the clamp 16ª, the tractor may be employed in the usual manner when so desired, as for example, when the tractor is merely used for hauling or some other operation where the tendency of the wheels to turn in a given direction is eliminated. In order to prevent the front wheels of the tractor from cutting or otherwise injuring the flexible element 18 during a turning movement of the tractor, I provide about this flexible element a metallic tubular protector sleeve 28, such as a small length of pipe or the like. This sleeve will act as a roller rotating upon the flexible element and preventing twisting of the flexible element to such a degree as would be liable to kink or destroy the same as well as preventing the cutting of the flexible element.

From the foregoing it is believed to be obvious that a steering mechanism constructed in accordance with my invention is particularly well adapted for the use for which it is intended for the reason that it eliminates the necessity of the operator maintaining a strain to prevent turning of the tractor and for the reason that it may be readily adjusted to compensate for different strains or may be entirely released when so desired. It will furthermore be obvious that the construction hereinbefore illustrated is capable of some change and modification without materially departing from the spirit of my invention and I accordingly do not limit myself thereto except as hereinafter claimed.

I claim:—

1. In combination with a steering mechanism embodying the usual steering spindles, rods connecting the arms of the spindles, drag link connected with one of the spindles, and a steering arm for operating the drag link, of means connecting a spindle arm and the steering arm for placing an adjustable tension upon the steering mechanism tending to turn the wheels thereof in one direction, including a spring connected with said spindle arm at one end, a yoke secured to said steering arm and embodying an ear, and a member longitudinally adjustable through said yoke and connected with the opposite end of the spring.

2. In combination with a steering mechanism embodying the usual steering spindles, rod connecting the arms of the spindles, drag link connected with one of the spindles, and a steering arm for operating the drag link, of means connecting a spindle arm and the steering arm for placing an adjustable tension upon the steering mechanism tending to turn the wheels thereof in one direction, including a spring connected at one end with said connecting rod, a yoke clamped upon said steering arm and embodying a swiveled ear having a threaded aperture, a threaded rod directed through said aperture and swivel connected at one end with the spring and provided at the opposite end with a crank whereby it may be rotated.

In testimony whereof I hereunto affix my signature.

HERBERT C. V. POULSEN.